US009193929B2

(12) United States Patent
Madden et al.

(10) Patent No.: US 9,193,929 B2
(45) Date of Patent: Nov. 24, 2015

(54) GEL-TYPE FUEL AND METHOD OF MAKING SAME

(71) Applicants: Brian Madden, Portsmouth, RI (US); Eric Anthony Barrett, La Lucia (ZA)

(72) Inventors: Brian Madden, Portsmouth, RI (US); Eric Anthony Barrett, La Lucia (ZA)

(*) Notice: Subject to any disclaimer, the term of this patent is extended or adjusted under 35 U.S.C. 154(b) by 0 days.

(21) Appl. No.: 13/854,077

(22) Filed: Mar. 30, 2013

(65) Prior Publication Data

US 2014/0290125 A1  Oct. 2, 2014

(51) Int. Cl.
*C10L 7/04* (2006.01)

(52) U.S. Cl.
CPC .......................................... *C10L 7/04* (2013.01)

(58) Field of Classification Search
CPC .......................................... C10L 7/04
USPC ........................................... 44/265, 266
See application file for complete search history.

(56) References Cited

U.S. PATENT DOCUMENTS

| 3,214,252 | A  | * | 10/1965 | Lehmacher ..................... 44/266 |
| 4,971,597 | A  | * | 11/1990 | Gartner ........................... 44/267 |
| 8,512,424 | B2 | * | 8/2013  | Dorries et al. ................... 44/266 |
| 2003/0217504 | A1 | * | 11/2003 | Merdjan et al. ................ 44/267 |
| 2013/0104446 | A1 | * | 5/2013  | Kort-Kamp .................... 44/266 |

* cited by examiner

*Primary Examiner* — Cephia D Toomer
(74) *Attorney, Agent, or Firm* — Gerald L. Robertson

(57) ABSTRACT

An improved gel-type fuel comprising three essential ingredients, namely, ethanol from renewable sources e.g. sugar cane, sugar beet, etc. water and a cellulose based gelling agent also from renewable sources. By varying the viscosity of the fuel with differing percentage of said gelling agent, three distinctly functioning fuels are produced as a gel, a pourable refilling fuel and a less viscous fire lighting fuel.

8 Claims, 1 Drawing Sheet

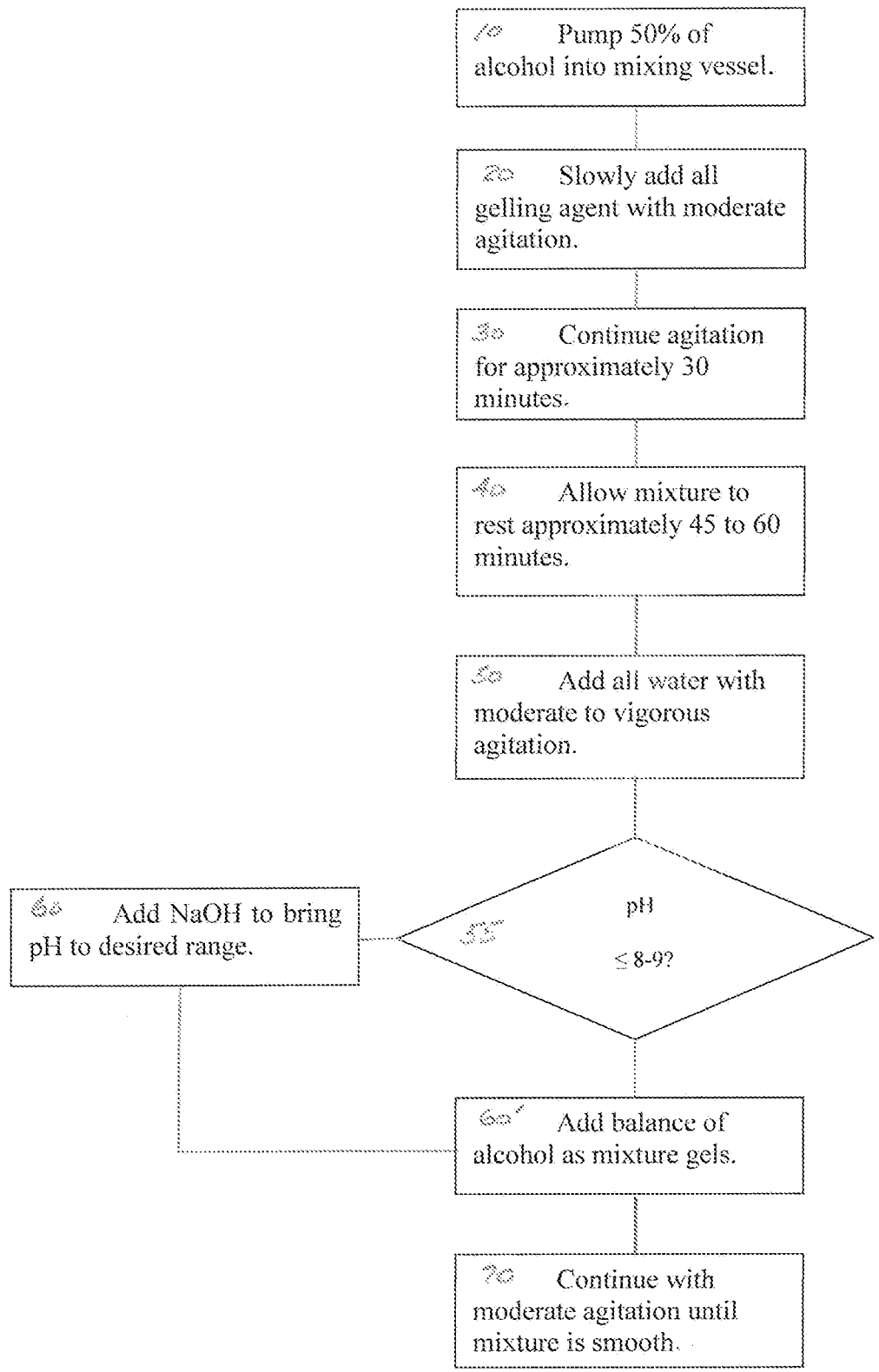

GEL-TYPE FUEL AND METHOD OF MAKING SAME

FIELD OF THE INVENTION

The invention pertains to the field of gel-type fuels, typically with an ethanol base.

REFERENCE TO RELATED APPLICATIONS

This application is an original first filing; no provisional, continuation or other document, has been filed with the United States Patent & Trademark Office by Applicant pertaining to this subject matter.

ACKNOWLEDGMENT OF GOVERNMENT SUPPORT

This invention was not developed with any type of government support. The government has no rights in applicant's invention.

BACKGROUND OF THE INVENTION

A market exists for fuels developed for application with cooking, catering, use in high-end kitchens for specific applications and for use in conjunction with banquets.

One such fuel which is quite common is Sterno®, produced by Sterno Group LLC which as of October 2012 is a subsidiary of Candle Lamp Company LLC, and typically sold in tins with tightly pressed lids sized to fit beneath a chafing dish or in another such receptacle for use in cooking (fondue, for example) or warming pre-cooked foods.

It is not uncommon to have many such chafing dishes in use during a buffet in a restaurant for hours at a time, or during an event where the meal service may last a duration requiring the use of refills of these tins to continue to warm food which may also be continually replenished for selection and consumption by the customers or attendees.

Common considerations which must be taken into account include:

adequate ventilation, as byproducts of combustion are released into the venue and present potential risk to the health of those exposed to it;

temperature, as the correct temperature is directly responsible for keeping the food being warmed at the right temperature not only for pleasurable consumption, but also to inhibit the growth of potentially harmful bacteria;

rate of combustion, as the consumption rate of the fuel determines how many times the tins must be replaced;

portability, as the volatility and transportability affect the transport and use of the fuel in a public and consumer-rich environment;

residual taste; and cost, which is always of concern as fuel costs rise and fall according to the laws of supply and demand, and in the case of ethanol, has experienced some market volatility depending on where and how the ethanol base has been generated.

These gel-type fuels typically contain several major constituents, a base fuel such as an alcohol, a nontoxic denaturant, a thickening agent and in some cases, pH balancers and other chemicals.

In the case of ventilation, it is important to have as clean burning a fuel as possible. Carbon based fuels contain harmful byproducts of combustion including $CO_2$, water and CO, carbon monoxide, potentially fatal to humans if inhaled instead of air. Ethanol, also called ethyl alcohol, pure alcohol, grain alcohol, or drinking alcohol, is a volatile, flammable, colorless liquid. A psychoactive drug and one of the oldest recreational drugs known, ethanol produces a state known as alcohol intoxication when consumed. Best known as the type of alcohol found in alcoholic beverages, it is also used in thermometers, as a solvent, and as a fuel. In common usage, it is often referred to simply as alcohol or spirits. Ethanol is already being used extensively as a fuel additive, and the use of ethanol fuel alone or as part of a mix with gasoline is increasing. Compared to methanol its primary advantage is that it is less corrosive and additionally the fuel is non-toxic, although the fuel will produce some toxic exhaust emissions. Ethanol combustion is: $C_2H_5OH + 3O_2 \rightarrow 2CO_2 + 3H_2O + heat$.

As can be seen, water and carbon dioxide comprise the byproducts of ethanol combustion, removing the risk of exposure to carbon monoxide by humans.

By employing ethanol as the base fuel in a gel-type fuel application for use in the restaurant and banquet arena, a safer and more public consumption friendly medium can be used.

One liter of ethanol contain 21.1 MJ, a liter of methanol 15.8 MJ and a liter of gasoline approximately 32.6 MJ. In other words, for the same energy content as one liter or one gallon of gasoline, one needs 1.6 liters/gallons of ethanol and 2.1 liters/gallons of methanol. The raw energy-per-volume numbers produce misleading fuel consumption numbers however, because alcohol-fueled engines can be made substantially more energy-efficient. A larger percentage of the energy available in a liter of alcohol fuel can be converted to useful work. This difference in efficiency can partially or totally balance out the energy density difference depending on the particular engines being compared.

Therefore, in the case of temperature, it is clear that ethanol provides plenty of ready energy for the rather benign function (comparatively speaking) of gently cooking or warming food. With the elimination of more toxic combustion byproducts, alcohol based fuel are well suited for the intended application.

With respect to rate of consumption, the formulation of the gel or thickening agent of the fuel in combination with the ratio of alcohol to water or other denaturant dictates the amount of release of available alcohol for burning.

Considering the factor of portability and other uses for alcohol based fuels, depending on the type of gelling or thickening agent used, different applications for the fuel may be realized.

In the United States, alcohol must be "denatured" to a quality that is non-beverage grade. This is accomplished by using a denaturant. This results also in the alcohol being exempted from taxes under the U.S. Treasury Department, Tax and Trade Bureau ("TTB") regulations. Several denaturants may be employed to satisfy these criterion and regulations.

Dorries et al. US Pub. No. US 2010/0186286 A1 Jul. 29, 2010, discloses a fuel gel including an alcohol, a nontoxic denaturant, a thickening agent, and at least one neutralizing agent. Primarily the formulation involves ethanol, denatonium benzoate, acrylic acid homopolymers, diisopropanolamine, corn-based glycerin and distilled water. As such, the use of what is essentially alcohol means that the fuel may derive from many sources such as methanol, meaning many variations also affecting overall fuel performance. and Merdjan et al. U.S. Pub. No. US 2003/0217504 A1 Nov. 27, 2003 discloses a fuel medium in a gel state consisting entirely of material from vegetable matter in combination with alcohol, primarily ethanol, and water. Methyl Hydroxylpropyl Cellulose MHPC is employed to create the gel.

While Merdjan strives to use entirely materials from vegetable matter as constituents in the fuel, the objective of using a more or less fully "organic" approach puts that approach above that of fuel efficiency, burning or consumption rate. Using vegetable matter produces less heat and does not provide sufficient control of burn time. The Dorries reference discloses a large number of constituents in several steps which result in a complex fuel with characteristics dictated thereby.

What is needed then is a fuel with the benefits associated with a sustainable and renewable fuel, with the desired burn rate and heat output.

Further, what is needed is a process which is easily followed with simple steps and which produces a clean burning fuel being the most desirable for use in connection with food service.

While many of these gel-type fuels have a basic formula, they are not necessarily suited for variations in the formulae which allow different functions, such as flowability for use as a refill for the original packaging. Nor does the prior art disclose nearly equivalent formulae for creating a more liquid fuel which can be even more flowable to be used as an ingniter for common uses in the food industry.

What is needed then is a formulaic base having multiple functions available by way of thickening or thinning such that the fuel may be used in chafers, as a flowable, effective refill for use in original or dedicated receptacles and as a more or less free-flowing fuel for use in igniting charcoal, for example, functions not found in the prior art of gel-type fuels.

The last criterion which separates superior products from ordinary fuels in the food service business is the factor of taste and smell. Having a fuel with effectively no adverse affect on taste or smell of the food is the differential between success and potential failure. Residual smells (also the basis of taste) from constituent of the fuel must be managed by either minimization, selection or avoidance.

What is needed then is a fuel having all the favored performance discussed herein including in addition, the elimination of effects of combustion manifest in taste and smell imparted to the food.

BRIEF SUMMARY OF THE INVENTION

Applicant has developed a formulation which performs in superior fashion in all the basic requirements for a superior gel-type fuel.

The constituents used are few, with flexibility in the ability to provide variations in the gel-type fuel. Minor formulaic adjustments allow a form of fuel with characteristics desired for use in refilling a fuel "cell" as well as an even more fluid state for use as an igniter typically needed in food service applications involving grilling and barbecuing.

Applicant's experience in testing has resulted in using Glyoxal as the thickening agent, the formulae may be varied slightly in order to achieve three differing forms of excellent performing gel-type fuel.

The essential ingredients in Applicants' formulation include: ethanol from renewable sources such as sugar cane, sugar beet, etc.; water: and a single cellulose based gelling agent also from renewable sources, in particular, Glyoxal.

By adjusting the viscosity, three distinct products are produced: i.e., a classic gel-type fuel for use in food prep or warming; a pourable product for use in refilling existing containers or dedicated receptacles, and an igniter which may be squirted on wood or charcoal to produce a fire, all performing with optimum consumption rate, proper temperature and without latent smell or taste to affect the taste of the food product. In Applicants' formulation, the viscosity ranges upward from a minimum of approximately 25,000 cPs to a maximum of approximately 80,000 cPs.

Thus, Applicant's flexible formula as described herein below sets it apart from gel-type fuels as they exist in the prior art not only by performance but by providing three useful functions.

BRIEF DESCRIPTION OF THE DRAWINGS

FIG. 1 is a process flow diagram illustrating the steps Applicant employs in the manufacture of the subject invention.

DETAILED DESCRIPTION OF THE INVENTION

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

For the "classic" gel-type fuel for use in chafers and for some cooking purposes includes three essential ingredients, namely, the base ingredient: ethanol from renewable sources e.g. sugar cane, sugar beet, etc. approximately 80% of the total volume with a variable allowance of ten percent less (70%) and ten percent more (90%) by volume; water in the approximate of 20% of the total volume with a potential variance of ten percent more (30%) or ten percent less (10%); and cellulose based gelling agent (also from renewable sources) mixed as a percentage of actual alcohol 2.5% for the chafing tins—allow a variance of 10% each way, or approximately 2.25% to approximately 2.75%.

For the "re-fillable" and pourable fuel for use in refilling the fuel "cells" provided with the original packaging or other specially provided or dedicated fuel containers, the ingredients comprise the same three as the "classic" fuel, namely, the base ingredient: ethanol from renewable sources e.g. sugar cane, sugar beet, etc. approximately 75% of the total volume with a variable allowance of ten percent less (67.5%) and ten percent more (82.5%) by volume; water in the approximate of 25% of the total volume with a potential variance of ten percent more (27.5%) or ten percent less (22.5%); and cellulose based gelling agent (also from renewable sources) mixed as a percentage of actual alcohol 2.25%—allowing a variance of 10% more and 10% less by volume.

For the fuel for use in "fire lighting", the ingredients vary as follows: the base ingredient ethanol from renewable sources e.g. sugar cane, sugar beet, etc. approximately 75% of the total volume with a variable allowance of ten percent less (67.5%) and ten percent more (82.5%) by volume; water in the approximate of 25% of the total volume with a potential variance of ten percent more (27.5%) or ten percent less (22.5%); and cellulose based gelling agent (also from renewable sources) mixed as a percentage of actual alcohol 1.5%— allowing a variance of 10% more and 10% less by volume.

The method of producing each of the three formulas of Applicants' fuel types employs the essential steps as follows and as depicted in FIG. 1:

As shown in FIG. 1, step 10 comprises pumping 50% of the alcohol into a mixing vessel.

Step 20 provides for slowly adding all of the gelling agent with moderate agitation.

Step 30 calls for continuing agitation for approximately 30 minutes.

Step 40 specifies allowing the mixture to rest for approximately 45 minutes to an hour.

Step 50 comprises adding all the water with moderate to vigorous agitation.

The next sequential step 55 requires a determination if the mixture has already achieved a pH of at least 8 to 9.

If no, the pH has not achieved a value of at least 8, then step 60 is used to add NaOH to the mixture to achieve the desired pH level.

If the pH has indeed met the desired minimum threshhold of 8, then step 60' is employed to add the balance of the alcohol as the mixture gels.

Step 70, the final step in the process is to continue with moderate agitation until the mixture achieves the desired smoothness.

Accordingly, it is to be understood that the embodiments of the invention herein described are merely illustrative of the application of the principles of the invention. Reference herein to details of the illustrated embodiment is not intended to limit the scope of the claims, which themselves recite those features regarded as essential to the invention.

What is claimed is:

1. A fuel gel comprising an alcohol, water and a thickening agent, said alcohol being ethanol, said thickening agent being Glyoxal.

2. The fuel gel of claim 1, comprising the following formula:
   70%-90% ethanol;
   10%-30% distilled water; and
   2.25%-2.72% Glyoxal.

3. The fuel gel of claim 2, wherein the pH of said fuel ranges between 8 and 9.

4. The fuel gel of claim 1, comprising the following formula:
   65%-85% ethanol;
   15%-35% water; and
   2.025%-2.475% Glyoxal.

5. The fuel gel of claim 4, wherein the pH of said fuel ranges between 8 and 9.

6. The fuel gel of claim 1, comprising the following formula:
   65%-85% ethanol;
   15%-35% water; and
   1.35%-1.65% Glyoxal.

7. The fuel gel of claim 6, wherein the pH of said fuel ranges between 8 and 9.

8. The process of manufacturing an improved gel-type fuel comprising the steps of:
   pumping approximately 50% of a predetermined volume of alcohol into a mixing vessel; slowly adding a predetermined volume of gelling agent with agitation creating a mixture, said gelling agent comprising Glyoxal;
   continuing agitation of said mixture for approximately 30 minutes;
   allowing said mixture to rest for approximately 45 minutes to an hour;
   adding the entirety of a predetermined volume of water to said mixture with agitation;
   determining whether said mixture has achieved a pH of at least 8 to 9;
   adding NaOH to said mixture to achieve a pH level of at least 8;
   adding the balance of the alcohol volume as said mixture gels; and continuing with agitation until said mixture achieves a predetermined smoothness.

\* \* \* \* \*